May 6, 1958 W. A. SPIERS 2,833,445
DISPENSER FOR POWDERED SOAP AND THE LIKE
Filed March 4, 1954 4 Sheets-Sheet 1
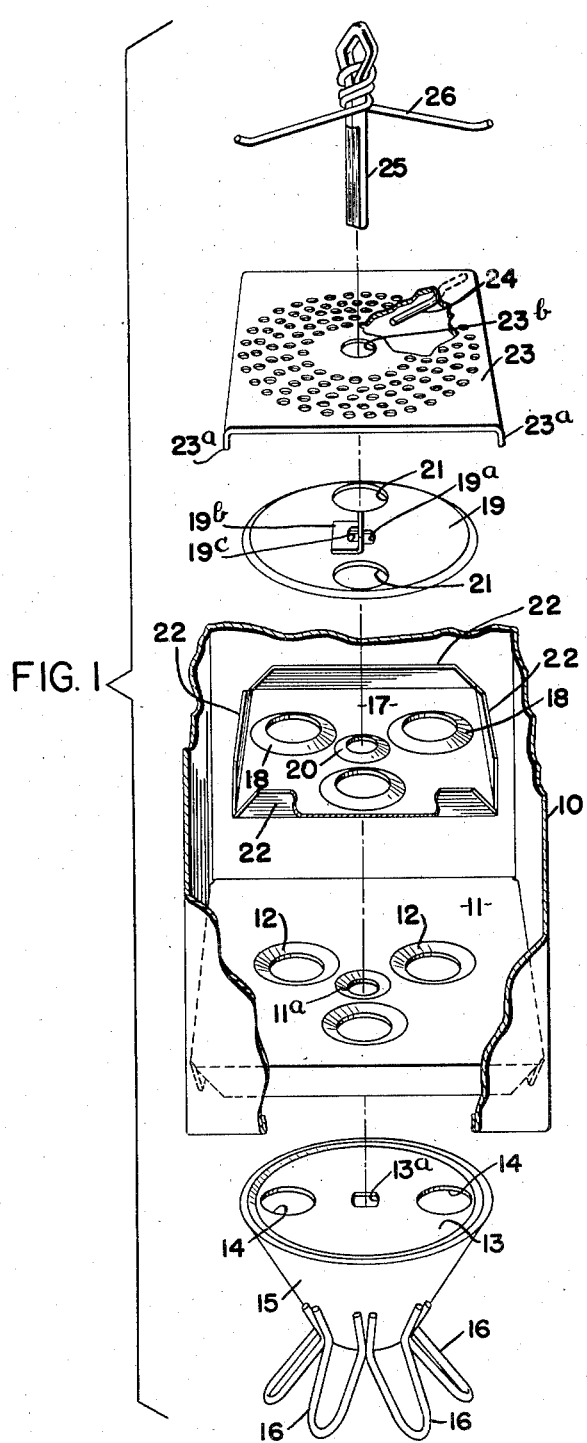
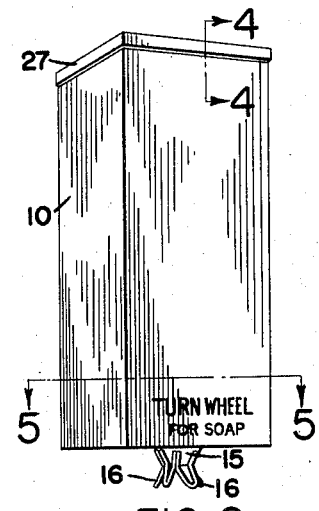
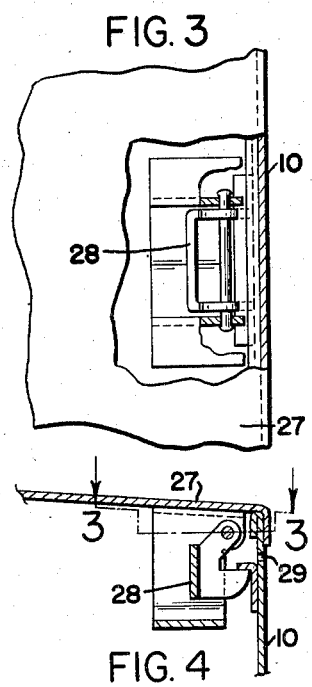
INVENTOR.
WALTER A. SPIERS
BY Willard D. Eakin
ATTORNEY May 6, 1958 W. A. SPIERS 2,833,445
DISPENSER FOR POWDERED SOAP AND THE LIKE
Filed March 4, 1954 4 Sheets-Sheet 2

INVENTOR.
WALTER A. SPIERS
BY
ATTORNEY

May 6, 1958   W. A. SPIERS   2,833,445
DISPENSER FOR POWDERED SOAP AND THE LIKE
Filed March 4, 1954   4 Sheets-Sheet 3
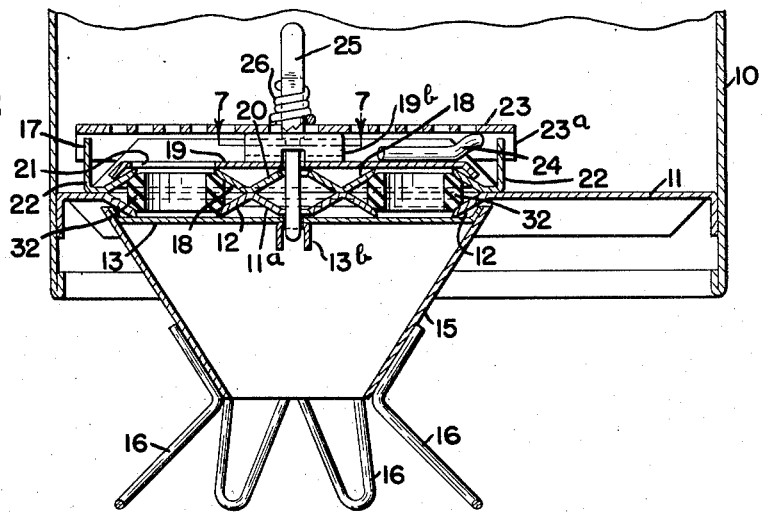
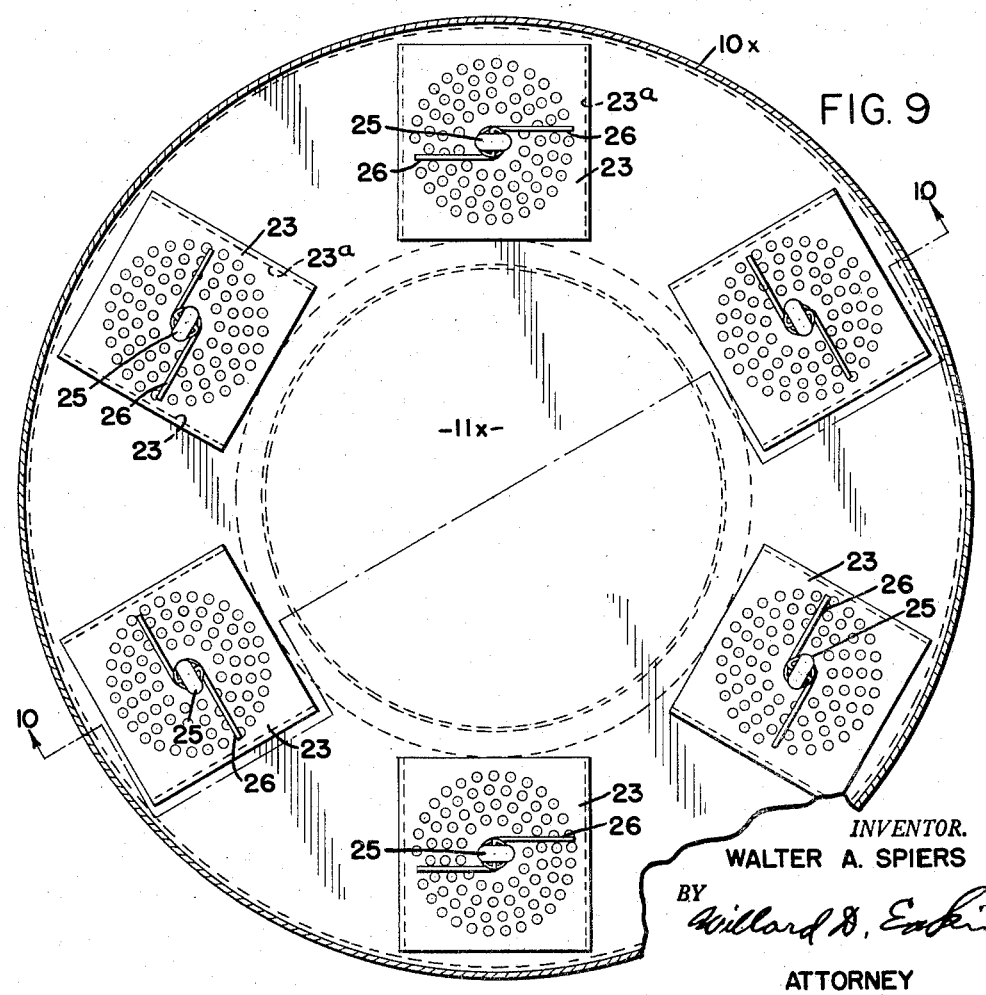
INVENTOR.
WALTER A. SPIERS
BY
*Willard D. Erskin*
ATTORNEY May 6, 1958 W. A. SPIERS 2,833,445
DISPENSER FOR POWDERED SOAP AND THE LIKE
Filed March 4, 1954 4 Sheets-Sheet 4

*INVENTOR.*
WALTER A. SPIERS
BY *Willard D. Eadie*
ATTORNEY

United States Patent Office 2,833,445
Patented May 6, 1958

2,833,445
DISPENSER FOR POWDERED SOAP AND THE LIKE

Walter A. Spiers, Akron, Ohio

Application March 4, 1954, Serial No. 414,051

5 Claims. (Cl. 222—189)

This invention relates to dispensers for powdered or comminuted materials such as soap in which a manual operation of the device results in the liberation of a limited quantity of the material.

In the case of soap dispensers a common fault has been that they become clogged or gummed up and after a short period of use fail to deliver the intended quantity of soap at each operation and frequent emptying and cleaning of the dispenser have been necessary.

My chief objects are to provide a dispenser free of such objections and adapted to continue in uniform and accurate operation over a long period of use, sufficient for the dispensing of a large quantity of material without re-filling and without the necessity of frequent cleaning.

Further objects are economy of construction and repair, facility of operation, ease of assembly and disassembly, and durability.

Of the accompanying drawings:

Fig. 1 is a composite perspective view, from a high viewpoint, of the parts, in disassembled relationship, of a single-unit dispenser embodying my invention in its preferred form.

Fig. 2 is a perspective view, on a smaller scale and from a low viewpoint, of the dispenser in condition for use.

Fig. 3 is a fragmentary view of the device from above, with parts sectioned on indirect line 3—3 of Fig. 4, to show a preferred type of lid-latching device.

Fig. 4 is a section on line 4—4 of Fig. 2.

Fig. 8 is a section on the indirect line 8—8 of Fig. 5.

Fig. 9 is a plan view, with the lid of the supply chamber omitted, of an assembly comprising a circumferentially spaced set of dispensing units in association with a single supply chamber common to them and mounted upon a circular spray head of a type commonly used in factories.

Figure 5:
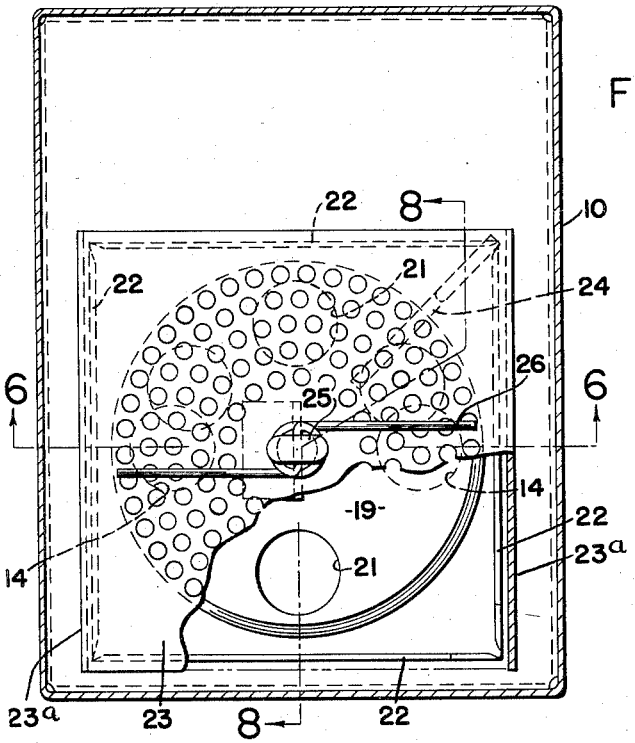
Fig. 5 is a section on line 5—5 of Fig. 2.
Figure 6:
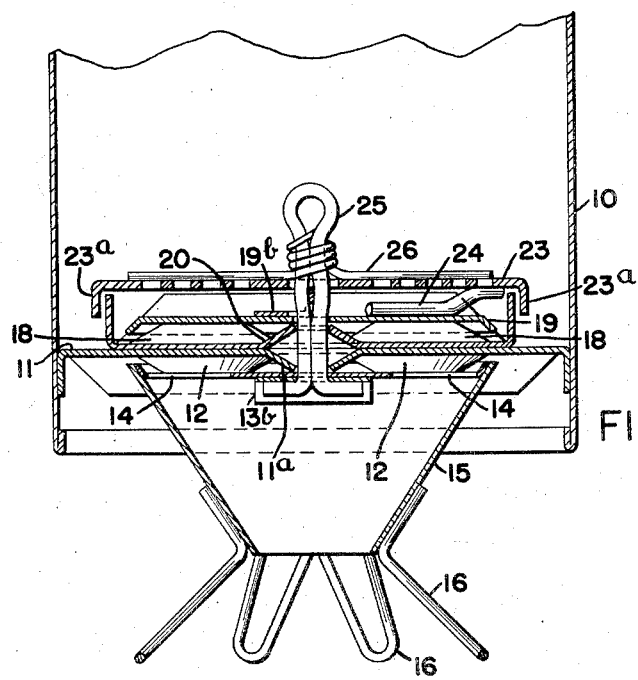
Fig. 6 is a section on line 6—6 of Fig. 5, with a part broken away.
Figure 7:
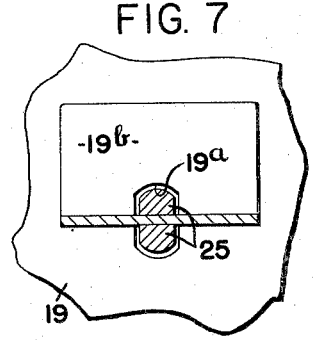
Fig. 7 is a section on line 7—7 of Fig. 8.

Referring first to the single-unit device shown in Figs. 1 to 8, the same comprises a soap-chamber cabinet or bin 10 having a side-wall portion and, welded in place near the lower end thereof, a material-controlling member or floor element 11 formed with three circumferentially spaced delivery holes defined by respective annular flanges 12, 12 which project downwardly and are of downwardly tapering conical shape, the annular lower edge of each flange being a scraping valve seat for a rotatable material-controlling member or valve plate 13 common to the three delivery holes in the floor element 11. The floor element 11 also is formed with a central circular hole defined by a downwardly projecting conical flange 11a having its annular lower edge in the same plane as that of the valve-seat flanges 12, 12.

The plate 13 is formed with two diametrically opposite delivery holes 14, 14 adapted to be brought into registry with the delivery holes in the element 11, one after another, as the plate is rotated in contact with the valve-seat flanges 12, 12 of the floor element 11.

The plate 13 is mounted as an upper end wall of a downwardly tapered funnel 15 which is provided with a set of wire loops 16, 16 welded to it as turning lugs. The plate 13 is formed with a non-circular central hole 13a, Fig. 1, for receiving and compelling the turning of a shaft member to be hereinafter described.

Welded in place in face-to-face relation upon the floor element 11 is a sheet-metal material-controlling member 17 formed with three spaced holes defined by upstanding conical valve seat flanges 18, 18 which correspond in shape to, and are registered with, the downwardly projecting hole-defining valve-seat flanges 12, 12 of the floor element 11. Each pair of registered conical flanges 12 and 18 defines a measuring chamber, and the upper annular edges of the flanges 18 are adapted substantially to seal against the lower face of a rotatable material-controlling member or valve plate 19. The non-rotating member 17 also is formed with a circular central hole defined by an upstanding conical flange 20 having its annular upper edge in the same plane as that of the upper edges of the flanges 18, 18.

The valve plate 19 is formed with two diametrically opposite holes 21, 21 adapted to be brought into registry, one after another, with the holes defined by the upstanding flanges 18 of the member 17, and also formed with a non-circular central hole 19a for rotation of the plate 19 by a shaft element hereinafter to be described.

An L-shaped hold-down and turning bracket 19b is welded to the upper face of the valve plate 19. It has an aperture 19c registered with a part of the aperture 19b and its upstanding part bridges the aperture 19a.

On its four sides respectively the member 17 has upturned flanges 22, 22 which serve as a support for a sifter plate 23 which has at two opposite sides down-turned marginal flanges 23a, 23a which straddle the member 17 to prevent rotation of the sifter plate 23.

Welded to the under face of the sifter plate is a scraper bar 24 having a projecting, downwardly off-set, inwardly extending portion for opposing rotation of the sifted soap with the valve plate 19 as the latter rotates in relation to the non-rotating sifter plate 23, so that relatively the sifted soap is scraped into the holes 21 of the valve plate 19.

For keeping the parts centered and compelling the plate 19 to rotate with the delivery funnel 15, a shaft, which can conveniently be a cotter-pin 25, extends through a circular hole 23b in the sifter plate 23, the non-circular hole 19a in the valve plate 19, the circular hole defined by the flange 20 of the member 17, the circular hole defined by the flange 11a of the floor member 11, and the non-circular hole 13a of the valve plate 13. The cotter pin 25 straddles the upstanding, bridging portion of the bracket 19b, as shown clearly in Figs. 6 and 7, for compelling rotation of the valve plate 19, and for holding the upper valve plate 19 upon the flanges 18, 18, 20 of the member 17. From above the valve plate 19 to its lower end the cotter pin is flatted on opposite sides, as shown clearly in Fig. 1, so that it has drive relationship with the valve plates 19 and 13 in extending through their non-circular holes 19a and 11a. At its lower end the prongs of the cotter pin are bent outward between the walls of a channel stamping 13b welded to the under face of the valve plate 13, as shown clearly in Figs. 6 and 8, as further security against relative rotation.

To agitate the soap powder and scrape it over and through the holes of the sifter plate 23 a spring wire 26 having its end portions as scraper arms is associated with the head and upper end portion of the cotter pin, as is clearly shown in Figs. 1, 5, 6 and 8, its scraper portions bearing with spring force against the upper face of the sifter plate.

The bin 10 is provided with a hinged cover 27 and to prevent tampering such as might result in theft or wetting of the soap in the bin an inside, gravity, cam-latch 28 is provided, as clearly shown in Figs. 3 and 4. When the bin is secured with its back to a wall the latch is adapted to be disengaged only by means of a small wire or pin inserted through an inconspicuous small hole 29, Fig. 4, in the wall of the bin at the position of the latch.

In the operation of this embodiment shown in Figs. 1 to 8, a short rotative movement imparted to the hopper 15 by means of the turning lugs 16 causes corresponding rotative movement of the scraper arms of the wire 26 upon the upper face of the sifter plate 23 and of the upper and lower valve plates 19 and 13.

The stationary scraper bar 24, resisting rotation of soap sifted onto the valve plate 19, causes the soap to be well distributed upon the rotary plate so that a suitable amount of it falls through each hole 21 whenever the hole 21 comes into registry with the mouth of a measuring chamber defined by any one of the three pairs of upwardly projecting conical flanges 18 and downwardly projecting conical flanges 12. Then whenever one of the holes 14 in the lower valve plate 13 comes into registry with one of the said measuring chambers the soap therein drops through the hole 14 and the funnel 15 onto the hand of the user.

The upper edges of the upper set of conical flanges and the lower edges of the lower set have a scraping action against the respective valve plates, for keeping the latter clean, and there is no extensive area of face-to-face sliding contact between the rotative plates and the non-rotative plates, and consequently no wedging and binding of soap between them. Any granule or particle of material that crowds between the plate 19 and the upper edge of the inclined flange 18, in spite of the scraping action, finds an easy avenue of escape through the central hole of the flange. The central flange 20 on the member 17 fits against the under face of the valve plate 19 and thus provides a substantially sealed bearing for the cotter-pin shaft.

For varying the capacity of the measuring chamber defined by a registered pair of the conical flanges 12 and 18 a rubber space-occupying bushing 32, permissibly an inexpensive rubber ring of rectangular cross-sectional shape, and of chosen space-occupying volume, can be snapped into the chamber as clearly shown in Fig. 8.

The device operates when the funnel 15 is turned in either direction for a suitable distance, and in the case of successive turns in the same direction only a short turning movement is required for each delivery of soap.

The turning loops 16, 16 are so shaped and so positioned that they are automatically kept clean and only the hand that receives the soap is required for operating the device.

As the sifting means 23—26 is spaced above the valve plate 19 it sifts the soap loosely onto the latter, for avoidance of wedging, binding or clogging.

Figure 10:
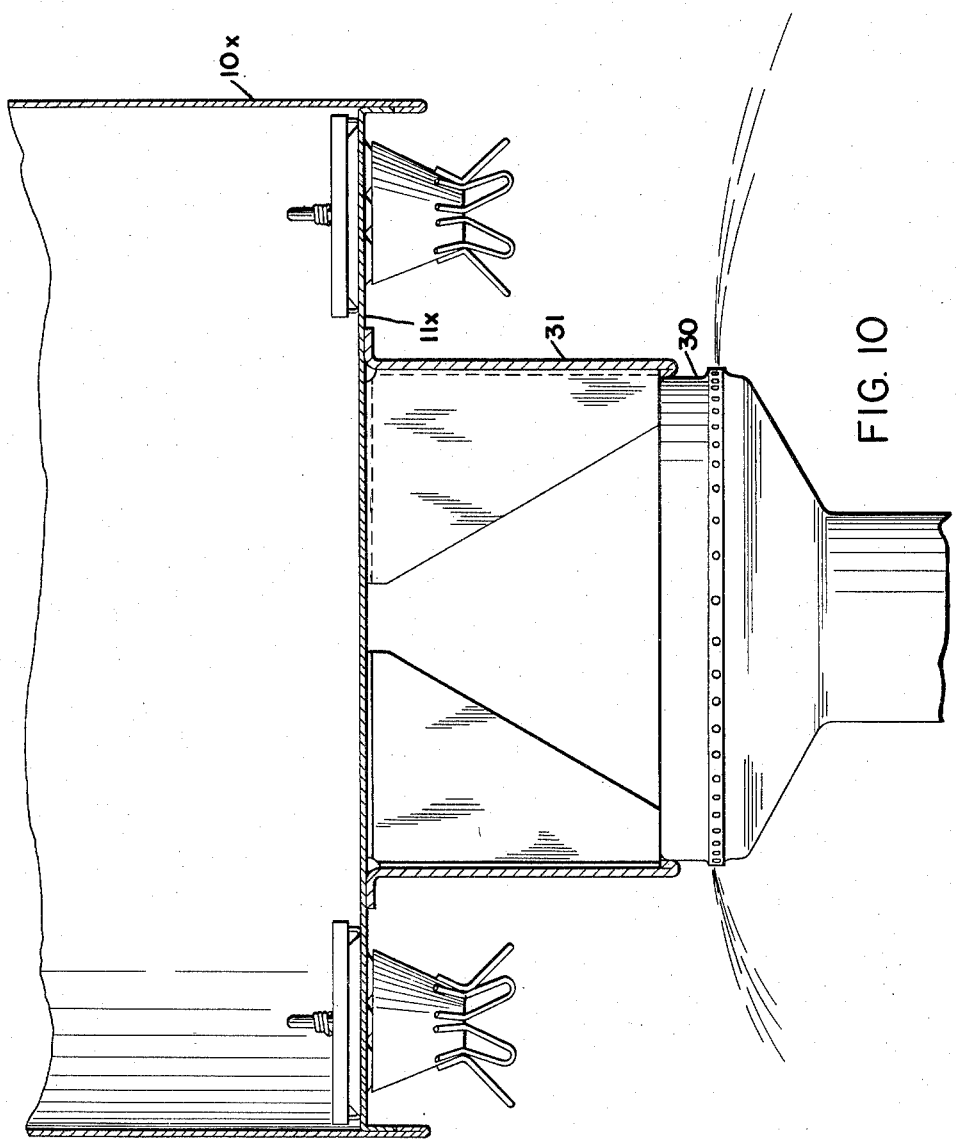
Fig. 10 is a section on the indirect line 10—10 of Fig. 9.

In the embodiment shown in Figs. 9 and 10, a single, large, circular soap bin 10x is symmetrically mounted upon a common type of wash-room spray-head 30, a supporting pedestal 31 being interposed between the spray-head and the bin's floor 11x to hold the bin at a suitable height above the spray.

At circumferentially spaced positions the floor 11x is formed with sets of conical flanges corresponding to those of the floor 11 in the single-unit embodiment above described and over each set is mounted an assembly corresponding to that of the single-unit embodiment excepting omission of the single-unit bin. The bin 10x and its floor 11x are common to all of these unit assemblies, each of which is operated, independently of the others, in the manner above described with respect to the single-unit embodiment.

Further modifications are possible without departure from the scope of the invention as defined in the appended claims.

Because the sifter plate 23 is spaced only a little way above the upper material-controlling plate 19, only a comparatively thin and correspondingly light layer of sifted soap, for example, accumulates upon the plate 19, the flow or discharge rates of the plates 23 and 19 being appropriately correlated, and consequently there is not enough weight of the sifted soap, upon itself, to cause it to pack or to form into lumps. At the same time, the sifter plate 23 being low in the bin 10, substantially the entire capacity of the bin is available for the receipt of a large supply of soap to be subsequently sifted and dispensed.

Another feature of the device that I have found to be of great practical value is the use, for the sifter plate, of apertured sheet metal, which does not become clogged, as distinguished from a wire mesh screen, which is highly subject to becoming clogged, especially in the case of soap, apparently because of its minute crevices, of highly retentive shape, between its wires. In the case of the apertured sheet metal screen soap entering the respective apertures is without tentacles, so to speak, and either falls through the aperture by gravity or is easily crowded through the aperture by the scraper wire 26, even in the case of soap that has acquired an unintended amount of moisture. The scraper wire 26 being of cylindrical form, it has an inclined face for crowding the material through the apertures.

I claim:

1. A device for dispensing a comminuted material, said device comprising a container for the material and means for dispensing material from the lower end of said container in successive controlled quantities, the dispensing means comprising coacting upper and lower, relatively rotatable, material-controlling members formed with respective material-conducting holes adapted to be put into and out of overlapped relation to each other by relative rotation of the two, a sifter mounted in the said container close to, but spaced above, the upper one of said members, said sifter comprising a foraminous material-screening member and an agitator above it, one of said screening member and said agitator being rotatable with respect to the other means below said screen member for pushing the sifted material into the holes of the upper material-controlling member, one of the said pushing means and said upper material-controlling member being rotatable with respect to the other, and means for concurrently actuating element of said sifter and said material-controlling members, the discharge rates of the sifter and of said material-controlling members being so correlated that only a layer of sifted material of non-packing thickness, and of a vertical thickness less than the minimum vertical dimension of the space between said sifter and the upper one of said material-controlling members, accumulates upon the said upper one of the said material-controlling members.

2. A device as defined in claim 1 in which the sifter comprises a material-supporting member formed of sheet material and with a multiplicity of material-passing apertures wholly defined by smooth walls extending continuously and without deviation from the material-receiving mouths of the apertures, at the upper face of the member, to their material-delivering ends, at the lower face of the member.

3. A device for dispensing a comminuted material, said device comprising a container for the material and means for dispensing material from the lower end of said container in successive controlled quantities, the dispensing means comprising a material-supporting sifting member formed of sheet material and with a multiplicity of material-passing apertures wholly defined by smooth walls extending, continuously and without deviation, from the material-receiving mouths of the apertures, at the upper face of said member, to their material-delivering ends, at the lower face of said member, means for disturbing the material on the upper surface of said member to cause the material to pass through its apertures, and measuring means below the said shifting member for catching material falling from it and measuring and dispensing the said material in successive small quantities measured by said measuring and dispensing means.

4. A device as defined in claim 3 in which the disturbing means is formed with an inclined face for crowding the material through the apertures.

5. A device for dispensing a comminuted material, said device comprising a container for the material and means for dispensing material from the lower end of said container in successive controlled quantities, the dispensing means comprising upper and lower material controlling members formed with respective material-controlling, material-conducting holes adapted to be put into and out of overlapped relation to each other, the hole of one of the said members being defined by an annular, uniformly thin-edged flange projecting from the face of the member and surrounding the hole as the wall thereof, the other of said members having a surface slidable in full-circle contact with the thin edge of the said flange, and yielding means for holding the two members with the said surface and the said edge in such contact.

References Cited in the file of this patent
UNITED STATES PATENTS

| Number | Name | Date |
|---|---|---|
| 154,870 | Johnson | Sept. 8, 1874 |
| 509,320 | Long | Nov. 21, 1893 |
| 1,083,378 | Smith | Jan. 6, 1914 |
| 1,133,254 | Backus | Mar. 30, 1915 |
| 1,306,150 | Kessler | June 10, 1919 |
| 1,605,210 | Bohmker | Nov. 2, 1926 |
| 1,733,749 | Patterson | Oct. 29, 1929 |
| 2,002,420 | Strosk | May 21, 1935 |
| 2,211,452 | Bowman | Aug. 13, 1940 |
| 2,306,748 | Peterson | Dec. 29, 1942 |
| 2,314,031 | Colburn | Mar. 16, 1943 |
| 2,328,363 | Sundholm | Aug. 31, 1943 |
| 2,661,871 | Huenergardt | Dec. 8, 1953 |
| 2,717,723 | Brunsting et al. | Sept. 13, 1955 |

U. S. DEPARTMENT OF COMMERCE
PATENT OFFICE

CERTIFICATE OF CORRECTION

Patent No. 2,833,445      Walter A. Spiers      May 6, 1958

It is hereby certified that error appears in the printed specification of the above numbered patent requiring correction and that the said Letters Patent should read as corrected below.

Column 4, line 50, after "actuating" insert -- the rotatable --.

Signed and sealed this 1st day of July 1958.

(SEAL)
Attest:
KARL H. AXLINE

Attesting Officer

ROBERT C. WATSON
Commissioner of Patents